US012689858B2

(12) United States Patent
Ren et al.

(10) Patent No.: US 12,689,858 B2
(45) Date of Patent: Jul. 21, 2026

(54) SPEAKER BOX

(71) Applicant: AAC Microtech (Changzhou) Co., Ltd., Changzhou (CN)

(72) Inventors: Zhang Ren, Changzhou (CN); Zhiwei Zhong, Changzhou (CN); Wei Song, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 265 days.

(21) Appl. No.: 18/518,646

(22) Filed: Nov. 24, 2023

(65) Prior Publication Data

US 2025/0133349 A1 Apr. 24, 2025

Related U.S. Application Data

(63) Continuation of application No. PCT/CN2023/125471, filed on Oct. 19, 2023.

(51) Int. Cl.
*H04R 9/06* (2006.01)
*H04R 9/02* (2006.01)
*H04R 9/04* (2006.01)

(52) U.S. Cl.
CPC ............... *H04R 9/06* (2013.01); *H04R 9/025* (2013.01); *H04R 9/045* (2013.01); *H04R 2400/11* (2013.01); *H04R 2499/11* (2013.01)

(58) Field of Classification Search
CPC .......... H04R 9/06; H04R 9/025; H04R 9/045; H04R 2400/11; H04R 2499/11; H04R 7/18; H04R 1/025; H04R 7/04; H04R 9/046; H04R 1/02; H04R 2209/022; H04R 1/028; H04R 31/006; H04R 7/127; H04R 7/16; H04R 9/063; H04R 1/24; H04R 9/02; H04R 1/06; H04R 9/043; H04R 2499/15
See application file for complete search history.

(56) References Cited

U.S. PATENT DOCUMENTS

2013/0011000 A1* 1/2013 Xi .......................... H04R 9/025 381/412
2015/0139479 A1* 5/2015 Lai .......................... H04R 9/025 381/412
2024/0073612 A1* 2/2024 Ren .......................... H04R 7/18
2024/0073620 A1* 2/2024 Ren .......................... H04R 9/06
2025/0133346 A1* 4/2025 Ren .......................... H04R 9/025
2025/0133347 A1* 4/2025 Ren .......................... H04R 9/025

* cited by examiner

*Primary Examiner* — Carolyn R Edwards
*Assistant Examiner* — Julie X Dang
(74) *Attorney, Agent, or Firm* — Wiersch Law Group

(57) ABSTRACT

The present application provides a speaker box and a stylus, and the speaker box includes a lower cover, an upper cover, a sounding driver, and side magnetic steels. The sounding driver includes a frame, a first frame, a vibration system fixed to the frame, and a magnetic circuit system to drive the vibration system. The magnetic circuit system includes a lower splint, a magnetic steel, a pole core formed with a projecting portion, and a first sub-magnetic steel. The magnetic steel includes a main magnetic steel and sub-magnetic steels arranged around the main magnetic steel and spaced apart to form a magnetic gap. The vibration system includes a diaphragm, a voice coil, a first diaphragm, and a first voice coil. The side magnetic steels are magnetized in an opposite direction to the sub-magnetic steels. The speaker box in this application can avoid inaccuracies in the stylus stroke.

9 Claims, 4 Drawing Sheets

A-A

SPEAKER BOX

CROSS-REFERENCE TO RELATED APPLICATIONS

This application is a continuation of International Application No. PCT/CN2023/125471, filed Oct. 19, 2023, the entire contents of which are incorporated herein by reference.

TECHNICAL FIELD

The present application relates to the field of electroacoustic conversion, in particular to a speaker box and a stylus.

BACKGROUND

The speaker box is an acoustic device designed for sound reproduction. It primarily consists of an upper cover, a lower cover that forms an accommodating space with the lower cover, and a sounding driver fixed in the accommodating space. The sounding driver separates the accommodating space into a front sound cavity and a rear cavity. The front sound chamber communicates with the sound-conducting channel of the upper cover, and forms a front chamber with the sound-conducting channel.

When the speaker box is used for a stylus, it is necessary to ensure that the magnetic leakage of the speaker box meets certain standards. In the related art, a magnetic system of the sounding driver is fixed to the frame through a lower splint, causing magnetic leakage at the four corners of the lower splint. However, this structural arrangement leads to excessive magnetic leakage, resulting in non-straight lines when using the stylus. In other words, the magnetic leakage of the speaker box in the related art cannot meet the standard, easily causing non-straight lines when using the stylus.

Therefore, it is necessary to provide a new speaker box to solve the above technical problem.

SUMMARY

An object of the present application is to provide a speaker box and a stylus to solve the problem that the magnetic leakage of the speaker box in the related art cannot meet the magnetic leakage standard of the stylus, which is likely to cause non-straight lines when using the stylus.

In order to achieve the above object, the present application provides a speaker box, comprising:

- a lower cover;
- an upper cover, covered on the lower cover and enclosed with the lower cover to form an accommodating space; wherein the upper cover comprises:
  - an upper cover body;
  - a support wall formed by an extension of the upper cover body in a direction of the lower cover; and
  - a sound-conducting channel formed in the upper cover body;
- a sounding driver, having a rectangular structure; wherein the sounding driver is accommodated in the accommodating space and fixedly supported on the support wall, and the sounding driver separates the accommodating space into a front sound cavity and a rear cavity, with a sounding side of the sounding driver being oriented toward the front sound cavity; the sound-conducting channel connects the front sound cavity to the outside world and forms a front cavity together with the front sound cavity; the sounding driver comprises:
  - a frame fixedly supported on the support wall;
  - a vibration system fixed to the frame; and
  - a magnetic circuit system configured to drive the vibration system, comprising:
    - a lower splint fixed to the frame;
    - a magnetic steel fixed to the lower splint, comprising:
      - a main magnetic steel; and
      - at least two sub-magnetic steels spaced apart and arranged around the main magnetic steel, wherein the main magnetic steel and the at least two sub-magnetic steels are spaced apart and together enclose a magnetic gap;
    - a pole core, fixedly stacked on a side of the main magnetic steel away from the lower splint, a central region of which is provided with a protruding portion extended along a direction away from the main magnetic steel; and
    - first sub-magnetic steels arranged around the protruding portion and spaced apart from each other to form a first magnetic gap, wherein the first sub-magnetic steels are fixedly stacked on a side of the pole core away from the lower splint;
- wherein the sounding driver further comprises a first frame fixed to a side of the first sub-magnetic steels away from the pole core; the vibration system comprises a diaphragm in the shape of an annulus and fixed to the first frame at its outer periphery, a voice coil configured to drive the diaphragm to vibrate, a first diaphragm fixed to the first frame at its outer periphery, and a first voice coil configured to drive the first diaphragm to vibrate; wherein an inner periphery of the diaphragm is fixed to a side of the first sub-magnetic steels away from the pole core; the voice coil is inserted and suspended in the magnetic gap, and the first voice coil is inserted and suspended in the first magnetic gap;
- wherein the speaker box further comprises side magnetic steels, which are fixed to the upper cover and magnetized in an opposite direction to the sub-magnetic steels, wherein the side magnetic steels and the sub-magnetic steels together form a magnetic circuit.

In one embodiment, the side magnetic steels are fixed at a position of the upper cover corresponding to a long-axis side of the sounding driver and/or a position of the upper cover corresponding to a short-axis side of the sounding driver.

In one embodiment, the side magnetic steels are fixed to a corner region of the upper cover corresponding to the sounding driver.

In one embodiment, the side magnetic steels comprise four; two of the side magnetic steels are in an arc shape and are fixed at positions of the upper cover corresponding to two adjacent corner regions of the sounding driver, and the other two of the side magnetic steels are in a strip shape and are fixed at positions of the upper cover corresponding to two short-axis sides of the sounding driver, respectively.

In one embodiment, a region where the side magnetic steels are fixed to the upper cover is the same as a region where the support wall is provided.

In one embodiment, the side magnetic steels are fixed to a side of the support wall away from the lower cover.

In one embodiment, the upper cover body is provided with an inwardly recessed groove on a side of the upper cover body away from the lower cover, and the side magnetic steels are fixed in the groove.

In one embodiment, the upper cover further comprises a through-hole through the upper cover body and a steel sheet covered on the through-hole and fixed to the upper cover body; the support wall is extended from the upper cover body towards the lower cover and arranged around the through-hole, and the groove is arranged around an edge of the through-hole.

In one embodiment, the upper cover further comprises a first powder filling hole arranged through the upper cover body; the lower cover is provided with a second powder filling hole, which is arranged through the lower cover; the first powder filling hole and the second powder filling hole are both connected to the rear cavity; wherein the speaker box further comprises a first cover plate covered on the first powder filling hole and a second cover plate covered on the second powder filling hole.

The present application further provides a stylus, comprising any one of the above-mentioned speaker boxes.

Compared with the related art, in the speaker box of the present application, the upper cover is secured to the side magnetic steels with a magnetization direction opposite to the sub-magnetic steels of the sounding driver. This configuration allows the side magnetic steels and the sub-magnetic steels to form a circuit, effectively counteracting the overflow of the magnetic field. Consequently, it reduces the magnetic leakage of the speaker box, preventing the magnetic field from failing to meet the magnetic leakage standards for a stylus and thereby avoiding inaccuracies in the stylus stroke caused by insufficient magnetic leakage.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

Figure 1:
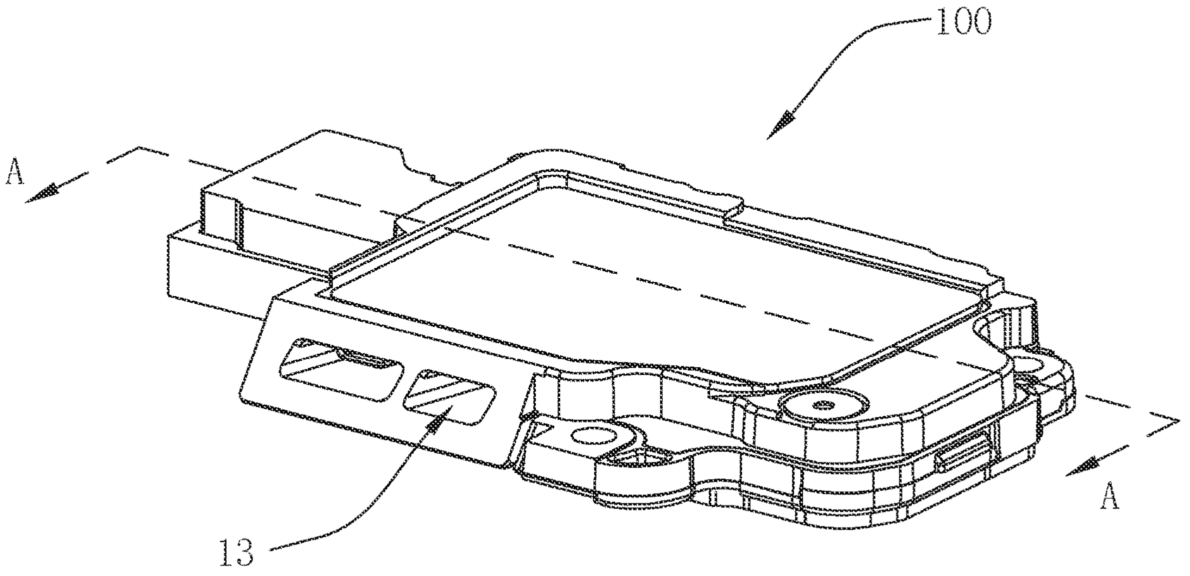
FIG. 1 shows a three-dimensional structural diagram of a speaker box according to an embodiment of the present application.

In the figures, 100, speaker box; 1, upper cover; 11, upper cover body; 111, groove; 12, support wall; 13, sound-conducting channel; 14, through-hole; 15, steel sheet; 16, first powder filling hole; 2, lower cover; 21, second powder filling hole; 3, sounding driver; 31, frame; 32, vibration system; 321, diaphragm; 322, voice coil; 323, first diaphragm; 324, first voice coil; 33, magnetic circuit system; 331, lower splint; 332, magnetic steel; 3321, main magnetic steel; 3322, sub-magnetic steel; 333, upper splint; 334, pole core; 3341, protruding portion; 335, first sub-magnetic steel; 336, first upper splint; 34, frame; 35, conductive member; 4, side magnetic steels; 5, first cover; 6, second cover; 10, front sound cavity; 20, rear cavity; 30, magnetic gap; 40, first magnetic gap.

DETAILED DESCRIPTION OF THE EMBODIMENTS

Unless otherwise defined, all technical and scientific terms used herein have the same meanings as are commonly understood by those skilled in the art to which this application belongs. The terms used herein in the specification of the present application are used only for the purpose of describing specific embodiments, and are not intended to limit the present application. The terms "include" and "have" and any variations thereof, as used in the specification, the claims, and the above-mentioned accompanying description of the present application, are intended to cover non-exclusive inclusion. The terms "first", "second", etc., in the specification, the claims, and the above-mentioned accompanying description of the present application are used to distinguish between different objects and are not intended to describe a particular order.

The term "embodiment" used in this document implies that particular features, structures, or characteristics described in the embodiments may be included in at least one embodiment of the present application. The presence of the phrase at various points in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

It should be noted that the terms "up", "down", "left", "right" and the like in the embodiments of the present application are made with reference to the illustrations in the accompanying drawings, and should not be construed as limiting embodiments of the present application. Furthermore, it should be understood that in the document, when referring to an element that constitutes an element "above" or "below" another element, it is possible that the element constitutes an element "above" or "below" another element directly, or that the element constitutes an element "above" or "below" another element through an intermediate element.

The technical solutions in the embodiments of the present application will be described clearly and completely in the following in conjunction with the accompanying drawings in the embodiments of the present application. Obviously, the described embodiments are only a part of the embodiments of the present application, and not all of the embodiments. Based on the embodiments in the present application, all other embodiments obtained by those of ordinary skill in the art without creative labor fall within the protection scope of the present application.

Figure 2:
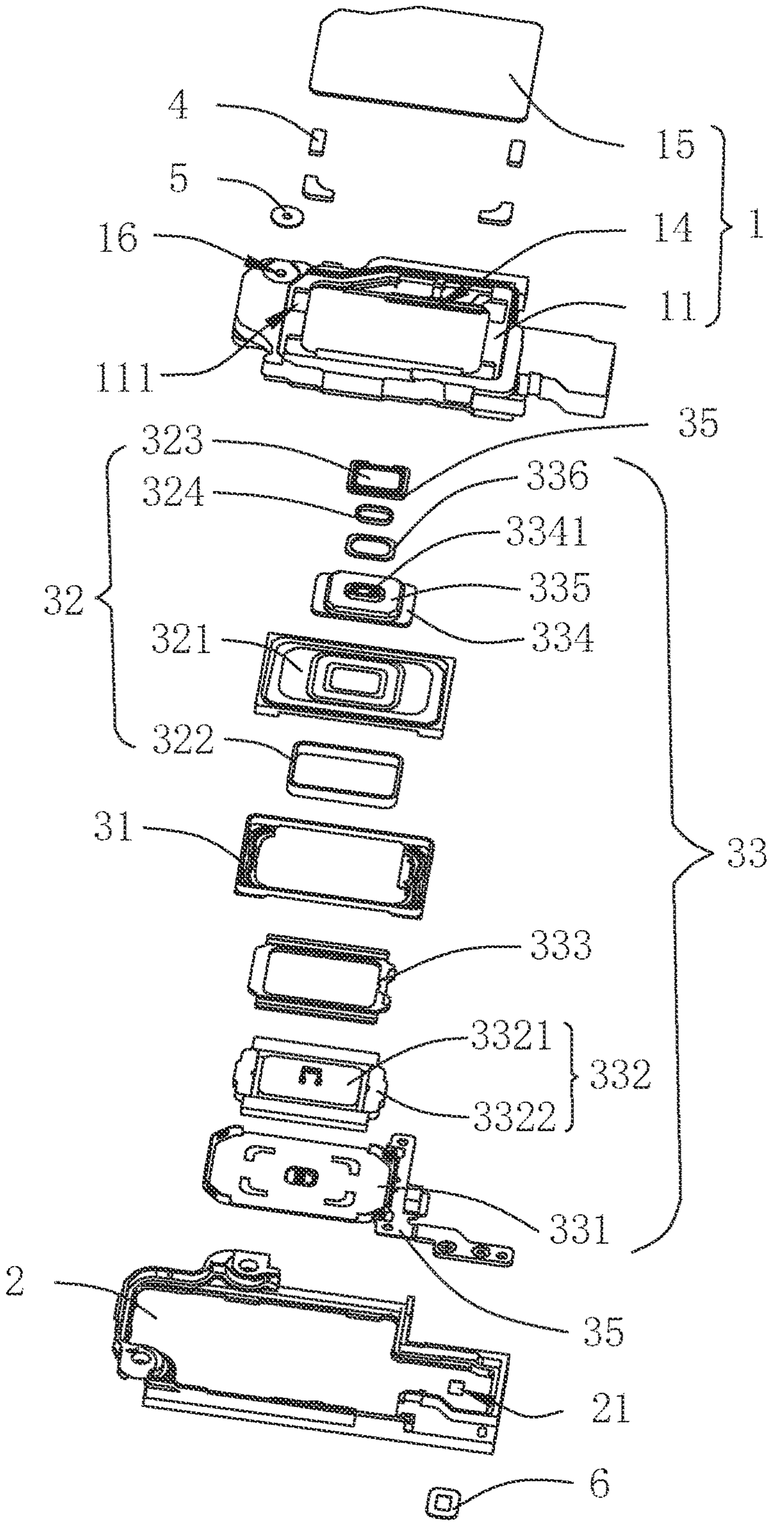
FIG. 2 shows an exploded view of the speaker box according to an embodiment of the present application.
Figure 3:
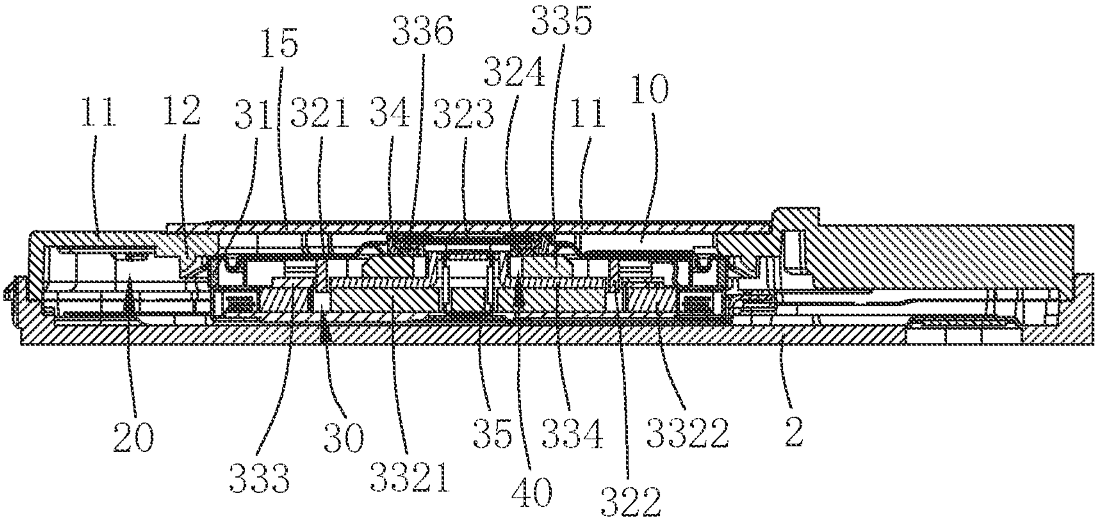
FIG. 3 shows a sectional view of line A-A in FIG. 1.
Figure 4:
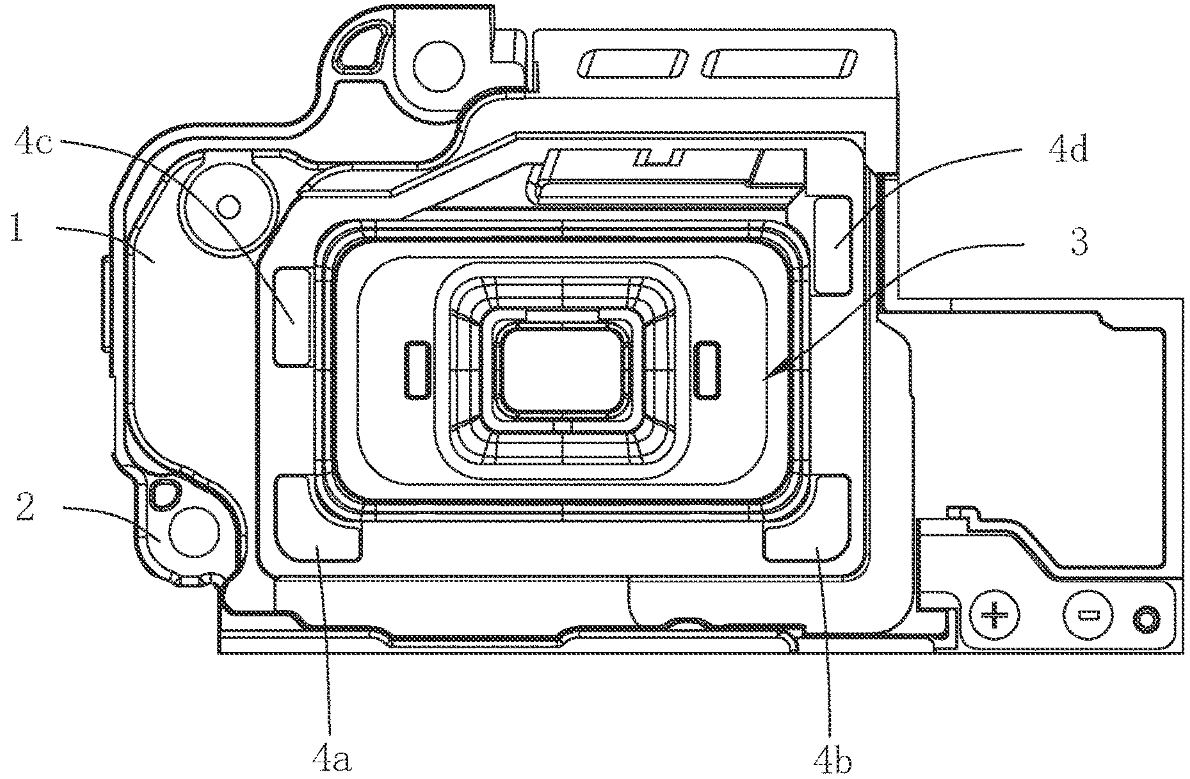
FIG. 4 shows a structural diagram of the speaker box after removing a steel sheet according to an embodiment of the present application.

As shown in FIGS. 1 to 4, an embodiment of the present application provides a speaker box 100, including an upper cover 1, a lower cover 2, a sounding driver 3, and side magnetic steels 4.

The upper cover 1 is covered on the lower cover 2 and jointly enclosed with the lower cover 2 to form an accommodating space (not shown in the figures). The upper cover 1 includes an upper cover body 11, a support wall 12 formed by extending from the upper cover body 11 to the lower cover 2, and a sound-conducting channel 13 formed in the upper cover body 11.

The sounding driver 3 is in a shape of rectangular. The sounding driver 3 is accommodated in the accommodating space and fixedly supported on the support wall 12. The sounding driver 3 separates the accommodating space into a front sound cavity 10 and a rear cavity 20, and a sounding side of the sounding driver 3 is oriented toward the front sound cavity 10. The sound-conducting channel 13 connects the front sound cavity 10 to the outside world and jointly forms a front cavity (not shown in the figures) together with the front sound cavity 10. The sounding driver 3 includes a frame 31 fixedly supported on the support wall 12, a vibration system 32 fixed to the frame 31, and a magnetic circuit system 33 configured to drive the vibration system 32. The magnetic circuit system 33 includes a lower splint 331 fixed to the frame 31 and a magnetic steel 332 fixed to the lower splint 331. The magnetic steel 332 includes a main magnetic steel 3321 and at least two sub-magnetic steels 3322 arranged around the main magnetic steel 3321 and spaced apart from each other, and the main magnetic steel 3321 and the sub-magnetic steels 3322 are spaced apart and together enclose a magnetic gap 40.

The side magnetic steels 4 are fixed to the upper cover 1 and are magnetized in an opposite direction to the sub-magnetic steels 3322. The side magnetic steels 4 and the sub-magnetic steels 3322 together form a magnetic circuit.

In this embodiment, the upper cover 1 further includes a through-hole 14 through the upper cover body 11, and a steel sheet 15 covered on the through-hole 14 and fixed to the upper cover body 11. The support wall 12 is extended from the upper cover body 11 to the lower cover 2 and arranged around the through-hole 14.

In this embodiment, the upper cover 1 further includes a first powder filling hole 16 arranged through the upper cover body 11. The lower cover 2 is provided with a second powder filling hole 21, which is arranged through the lower cover 2. Both the first powder filling hole 16 and the second powder filling hole 21 are connected to the rear cavity 20. The speaker box 100 further includes a first cover plate 5 provided over the first powder filling hole 16, and a second cover plate 6 provided over the second powder filling hole 21.

In this embodiment, the sub-magnetic steels 3322 include four. Two of the sub-magnetic steels 3322 are arranged on two short-axis sides of the main magnetic steel 3321, and the other two are arranged on two long-axis sides of the main magnetic steel 3321.

In this embodiment, the magnetic circuit system 33 further includes an upper splint 333 fixedly stacked on a side of the sub-magnetic steels 3322 away from the lower splint 331.

Specifically, the magnetic circuit system 33 further includes a pole core 334, a first sub-magnetic steels 335, and a first splint 336. The pole core 334 is fixedly stacked on a side of the main magnetic steel 3321 away from the lower splint 331, and a central region of the pole core 334 is provided with a protruding portion extended along a direction away from the main magnetic steel 3321. The first sub-magnetic steels 335 are arranged around the protruding portion 3341 and spaced apart from each other to form a first magnetic gap 40. The first upper splint 336 is fixedly stacked on a side of the first sub-magnetic steels 335 away from the pole core 334.

Specifically, the sounding driver 3 further includes a first frame 34 fixed to a side of the first sub-magnetic steels 335 away from the pole core 334. The vibration system 32 includes a diaphragm 321 in a ring shape, an outer periphery of which is fixed to the first frame 34, a voice coil 322 configured to drive the diaphragm to vibrate 321, a first diaphragm 323 fixed to the first frame 34 at its outer peripheral, and a first voice coil 324 configured to driving a vibration of the first diaphragm 323. An inner peripheral edge of the diaphragm 321 is fixed to a side of the first side magnetic steels 335 away from the pole core 334. The voice coil 322 is inserted and suspended in the magnetic gap 30, and the first voice coil 324 is inserted and suspended in the first magnetic gap 40.

Specifically, the side magnetic steels 4 are fixed at a position of the upper cover 1 corresponding to a long-axis side of the sounding driver 3 and/or a position of the upper cover 1 corresponding to a short-axis side of the sounding driver 3.

Of course, the side magnetic steels 4 may also be fixed to a corner region of the upper cover 1 corresponding to the sounding driver 3.

In this embodiment, the side magnetic steels 4 have four, including a first side magnetic steel **4*a*, a second side magnetic steel 4*b*, a third side magnetic steel 4*c*, and a fourth side magnetic steel 4*d*. Two of the side magnetic steels 4 are in an arc shape and are fixed to the position of the upper cover 1 corresponding to the corner regions of the sounding driver 3, i.e., the first side magnetic steel 4*a* and the second side magnetic steel 4*b* are in an arc shape and are fixed to the position of the upper cover 1 corresponding to the two corner regions of the sounding driver 3. The other two side magnetic steels 4 are in a strip shape and are respectively fixed to the position of the two short-axis sides of the upper cover 1 corresponding to the sounding driver 3, i.e., the third side magnetic steel 4*c* and the fourth side magnetic steel 4*d* are in a strip shape and are fixed to the positions of the two short-axis sides of the upper cover 1 corresponding to the sounding driver 3**.

Of course, the number of side magnetic steels 4 and the specific setting positions may also be adaptively adjusted according to the practical requirements, and are not limited to a specific configuration as defined in this embodiment. Besides, the shape and size of the side magnetic steels 4 may also be adaptively adjusted according to the specific shape of the speaker box 100.

Specifically, the region in which the side magnetic steels 4 is fixed to the upper cover 1 is the same as a region where the support wall 12 is provided. Besides, the side magnetic steels 4 are fixed to a side of the support wall 12 away from the lower cover 2.

In this embodiment, a side of the upper cover body 11 away from the lower cover 2 is provided with an inwardly recessed groove 111. The side magnetic steels 4 are fixed in the groove 111. That is, the groove 111 is arranged around an edge of the through-hole 14 of the upper cover 1.

In this embodiment, the sounding driver 3 further includes a conductive member 35 fixed to a side of the lower splint 331 away from the main magnetic steel 3321. The conductive member 35 is extended below the first diaphragm 323 through the lower splint 331, the main magnetic steel 3321, and the protruding portion 3341 and is electrically connected to the first voice coil 324. The conductive member 35 includes a fixing portion fixed to the lower splint 331, and a connecting portion extended below the first diaphragm 323 through the lower splint 331, the main magnetic steel 3321, and the protruding portion 3341.

In the speaker box 100 in this embodiment, the upper cover 1 is secured to the side magnetic steels with a magnetization direction opposite to the sub-magnetic steels 3322 of the sounding driver 3. This configuration allows the side magnetic steels and the sub-magnetic steels 3322 to form a circuit, effectively counteracting the overflow of the magnetic field. Consequently, it reduces the magnetic leakage of the speaker box 100, preventing the magnetic field from failing to meet the magnetic leakage standards for a stylus and thereby avoiding inaccuracies in the stylus stroke caused by insufficient magnetic leakage.

The embodiments of the present application further provide a stylus including the above-mentioned speaker box 100, and since the stylus in this embodiment includes the above-mentioned speaker box 100, it can also achieve the technical effect that the above-mentioned speaker box 100 can achieve, which will not be repeated herein.

It should be noted that the above embodiments described with reference to the accompanying drawings are only for illustrating the present application rather than limiting the scope of the present application. It should be understood that those of ordinary skill in the art should understand that modifications or equivalent replacements to the present application without departing from the spirit and scope of the present application should be covered within the scope of the present application. Furthermore, unless the context otherwise indicates, words appearing in the singular form include the plural form and vice versa. Furthermore, unless specifically stated, all or part of any embodiment may be used in conjunction with all or part of any other embodiment.

What is claimed is:

1. A speaker box, comprising:

a lower cover;

an upper cover, covered on the lower cover and enclosed with the lower cover to form an accommodating space; wherein the upper cover comprises:

an upper cover body;

a support wall formed by an extension of the upper cover body in a direction of the lower cover; and a sound-conducting channel formed in the upper cover body;

a sounding driver, having a rectangular structure; wherein the sounding driver is accommodated in the accommodating space and fixedly supported on the support wall, and the sounding driver separates the accommodating space into a front sound cavity and a rear cavity, with a sounding side of the sounding driver being oriented toward the front sound cavity; the sound-conducting channel connects the front sound cavity to the outside world and forms a front cavity together with the front sound cavity; the sounding driver comprises:

a frame fixedly supported on the support wall;

a vibration system fixed to the frame; and a magnetic circuit system configured to drive the vibration system, comprising:

a lower splint fixed to the frame;

a magnetic steel fixed to the lower splint, comprising:

a main magnetic steel; and at least two sub-magnetic steels spaced apart and arranged around the main magnetic steel, wherein the main magnetic steel and the at least two sub-magnetic steels are spaced apart and together enclose a magnetic gap;

a pole core, fixedly stacked on a side of the main magnetic steel away from the lower splint, a central region of which is provided with a protruding portion extended along a direction away from the main magnetic steel; and first sub-magnetic steels arranged around the protruding portion and spaced apart from each other to form a first magnetic gap, wherein the first sub-magnetic steels are fixedly stacked on a side of the pole core away from the lower splint;

wherein the sounding driver further comprises a first frame fixed to a side of the first sub-magnetic steels away from the pole core; the vibration system comprises a diaphragm in the shape of an annulus and fixed to the first frame at its outer periphery, a voice coil configured to drive the diaphragm to vibrate, a first diaphragm fixed to the first frame at its outer periphery, and a first voice coil configured to drive the first diaphragm to vibrate; wherein an inner periphery of the diaphragm is fixed to a side of the first sub-magnetic steels away from the pole core; the voice coil is inserted and suspended in the magnetic gap, and the first voice coil is inserted and suspended in the first magnetic gap;

wherein the speaker box further comprises side magnetic steels, which are fixed to the upper cover and magnetized in an opposite direction to the sub-magnetic steels, wherein the side magnetic steels and the sub-magnetic steels together form a magnetic circuit.

2. The speaker box of claim 1, wherein the side magnetic steels are fixed at a position of the upper cover corresponding to a long-axis side of the sounding driver and/or a position of the upper cover corresponding to a short-axis side of the sounding driver.

3. The speaker box of claim 1, wherein the side magnetic steels are fixed to a corner region of the upper cover corresponding to the sounding driver.

4. The speaker box of claim 1, wherein the side magnetic steels comprise four; two of the side magnetic steels are in an arc shape and are fixed at positions of the upper cover corresponding to two adjacent corner regions of the sounding driver, and the other two of the side magnetic steels are in a strip shape and are fixed at positions of the upper cover corresponding to two short-axis sides of the sounding driver, respectively.

5. The speaker box of claim 1, wherein a region where the side magnetic steels are fixed to the upper cover is the same as a region where the support wall is provided.

6. The speaker box of claim 5, wherein the side magnetic steels are fixed to a side of the support wall away from the lower cover.

7. The speaker box of claim 6, wherein the upper cover body is provided with an inwardly recessed groove on a side of the upper cover body away from the lower cover, and the side magnetic steels are fixed in the groove.

8. The speaker box of claim 7, wherein the upper cover further comprises a through-hole through the upper cover body and a steel sheet covered on the through-hole and fixed to the upper cover body; the support wall is extended from the upper cover body towards the lower cover and arranged around the through-hole, and the groove is arranged around an edge of the through-hole.

9. The speaker box of claim 1, wherein the upper cover further comprises a first powder filling hole arranged through the upper cover body; the lower cover is provided with a second powder filling hole, which is arranged through the lower cover; the first powder filling hole and the second powder filling hole are both connected to the rear cavity; wherein the speaker box further comprises a first cover plate covered on the first powder filling hole and a second cover plate covered on the second powder filling hole.

* * * * *